No. 788,362. PATENTED APR. 25, 1905.
H. C. LAVERY.
ANATOMICAL MEASURING AND RECORDING MACHINE.
APPLICATION FILED JULY 14, 1904.

WITNESSES:

INVENTOR
Henry C. Lavery,
BY
Attorney

No. 788,362. Patented April 25, 1905.

UNITED STATES PATENT OFFICE.

HENRY C. LAVERY, OF SUPERIOR, WISCONSIN.

ANATOMICAL MEASURING AND RECORDING MACHINE.

SPECIFICATION forming part of Letters Patent No. 788,362, dated April 25, 1905.

Application filed July 14, 1904. Serial No. 216,530.

*To all whom it may concern:*

Be it known that I, HENRY C. LAVERY, a citizen of the United States of America, residing at Superior, in the county of Douglas and State of Wisconsin, have invented certain new and useful Improvements in Anatomical Measuring and Recording Machines, of which the following is a specification.

This invention relates to a machine designed for the measurement and delineation of the physical characteristics of parts of the human body, and has in view the provision of means for accurately measuring a selected part of the body to be studied and delineated and then recording those measurements in readings delineating the physiological and other conditions indicated thereby. In this aspect the invention is applicable to any part of the anatomy susceptible to measurement and delineation through such measurements; but the same possesses special utility as a brain measuring and delineating machine based upon the principles underlying phrenological examinations.

It is well known that a phrenological examination is designed to show in an accurate scientific manner the size and development of brain of the person measured and to furnish a basis upon which an accurate and reliable knowledge of the character may be determined. With these measurements determined a complete delineation of the character can be readily given, and the present invention therefore contemplates in the form presented in this application means for accurately measuring the head over the different faculties of intelligence to indicate the condition of those faculties at normal, above normal, or below normal in various degrees and then record these measurement in a phrenograph embodying printed readings giving a scientific statement of the physiological meaning of the indicated measurements.

Another distinctive feature of the invention resides in adapting the improvements to a machine of the coin-controlled type wherein upon prepayment of a check or coin of the proper value a person can set the machine so as to secure one complete measurement of the head and have delivered to him a phrenograph, preferably in the shape of a printed strip or card, containing thereon a reading for each of the faculties of intelligence measured by the machine. After thus being operated the machine resumes an inactive or idle position, so that it cannot be operated again till another coin is introduced.

With these and many other objects in view, which will more readily appear as the nature of the invention is better understood, the same consists in the novel construction, combination, and arrangement of parts, which will be hereinafter more fully described, illustrated, and claimed.

The essential features of the invention involved in means for measuring a selected part of the anatomy and automatically recording readings for each of the measured zones or sections are necessarily susceptible to a wide range of modification from a structural standpoint, and the specific purpose of the machine, without departing from the scope of the invention, but a preferred embodiment thereof, is shown in the accompanying drawings, in which—

Like reference characters designate corresponding parts in the several figures of the drawings.

In its general organization the machine includes, first, a measuring device designed to be applied to the selected part of the body to be studied and delineated, and, second, a recording mechanism coöperating with the measuring device and comprising means for automatically recording upon a tape or other blank accurate scientific readings for each of the measured zones or sections.

Referring first to that part of the machine which constitutes the measuring device, the same will be described in reference to its preferred adaptation—namely, as a phrenometer for measuring the faculties of intelligence of the head, and hence determining the size and character of the brain contained therein. In this form of the invention the measuring device includes what may be characterized in its entirety as a "head-piece," (designated by the numeral 1.) This head-piece 1 may be constructed in various ways; but in the adaptation of the machine for head-measurements said head-piece is preferably in the form of a hood, helmet, or like head-covering and of sufficient size to receive therein any sized head.

In the form shown in the drawings the head-piece 1 is illustrated as being of a concavo-convex configuration and essentially comprises a semispherical case 2 of a hollow construction to accommodate and house therein the various working parts of the measuring device. This semispherical case 2 is also provided at the top and center thereof with a tubular extension 3, within which is arranged certain parts of the mechanism, as will presently appear. The head-piece, hood, or helmet 1 may be suspended in any suitable manner in convenient position for a person to readily position the head therein; but a simple method of supporting the head-piece 1 is shown in the drawings and essentially consists of a suspending-bracket 4, having a bifurcated outer end portion 5, within which is pivotally mounted, as at 6, the head-piece. The suspending-bracket 4 is pivotally supported at its inner end, as at 7, upon an upright standard 8, and a counterbalance-spring 9 may be arranged to provide a yielding connection between the bracket 4 and standard 8 at one side of the pivotal mounting 7. Any equivalent support could obviously be substituted which will provide for the convenient hanging of the head-piece or helmet in an elevated position. The case, consisting of the semispherical member 2 and the tubular extension 3, accommodates therein the entire measuring device, made up of a plurality of individual measurers each designed to provide for the measurement of a certain anatomical section or zone.

Figure 1:
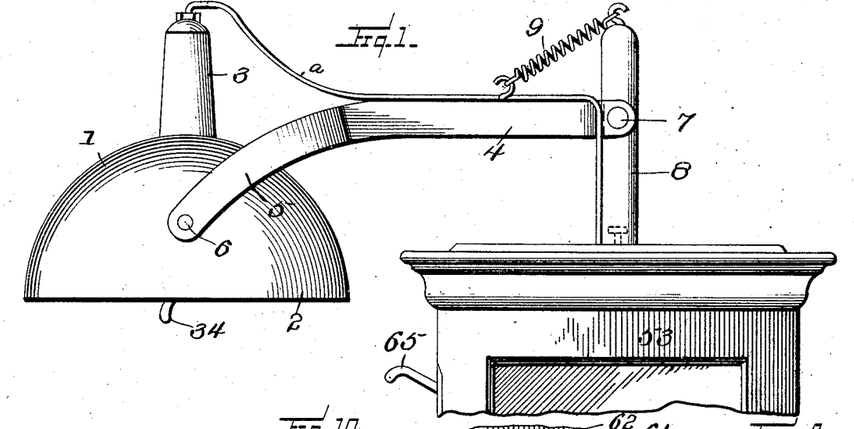
Figure 1 is a general view of a brain measuring and delineating machine embodying the present invention.
Figures 2, 6, 7:
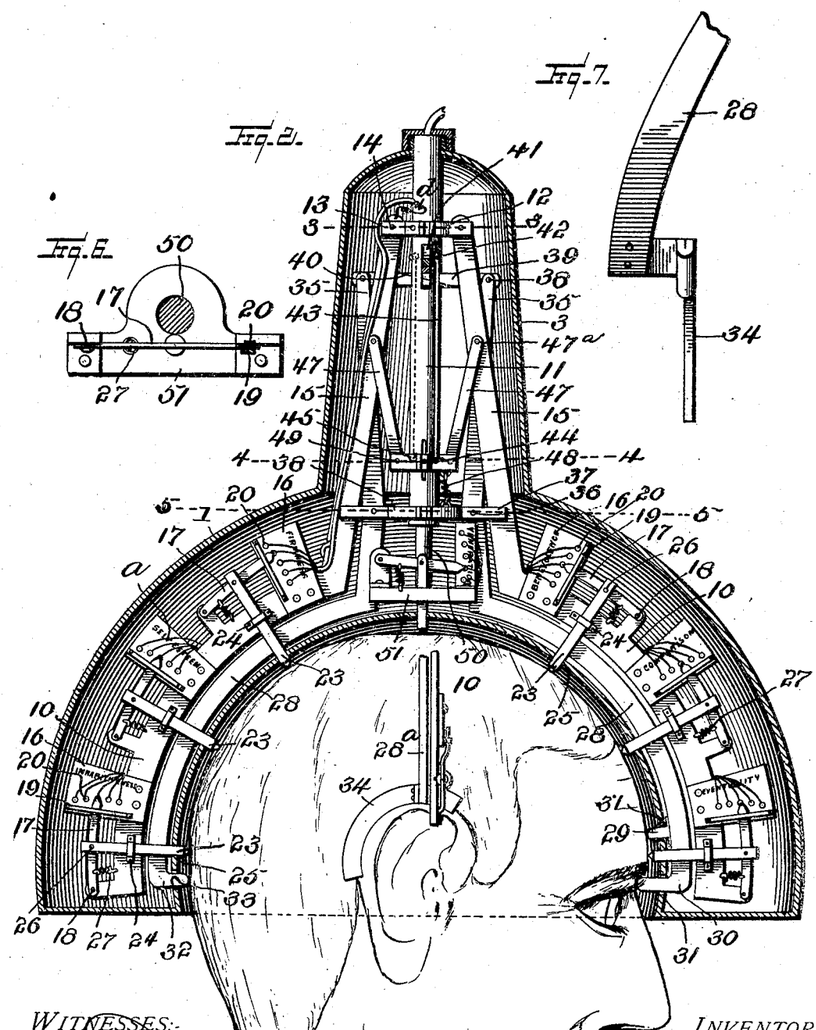
Fig. 2 is an enlarged sectional view of the measuring device constituting a part of the complete machine, said view including in outline a head arranged in position for measurement.
Fig. 6 is a detail top view of the centrally-located measurement-indicator, which is not supported by the swinging indicator-carriers, but has a proportional adjustment in unison therewith.
Fig. 7 is a detail view of one of the side positioning members carrying a locating element coöperating with the ear.

In the preferred adaptation of the invention herein disclosed (for the measurement and delineation of the brain) each individual measurer is designed to provide for the measurement of one of the head-sections representing one of the faculties of intelligence according to the usual phrenological subdivisions of the human head. In this connection each individual measurer is intended to indicate the relative size of the head-section or faculty compared with a perfectly normal condition of a perfect head. Referring more particularly to the illustrated construction of the measuring device for carrying out this function, it will be seen that the same primarily includes in its general organization a radially-arranged series of indicator-carriers 10, which may be conveniently in the form of segmental supporting-bars and arranged in the semispherical case 2. There is a sufficient space between the outer and inner walls of the semispherical case to provide for the adaptation of the individual measurers to the particular size of head being measured, as will hereinafter appear. There may be any number of indicator-carriers 10 arranged within the semispherical case of the head-piece, according to the number of head-sections or faculties to be measured by the machine; but as all of the carriers and the individual measurers associated therewith are duplicates it has been deemed sufficient for illustrative purposes to show in Fig. 2 of the drawings a construction providing for front and rear sets of individual measurers and also opposite side sets arranged above the ear. The said indicator-carriers are radially arranged with reference to a common central support, preferably in the form of a central supporting-post 11, arranged centrally within the upright tubular case extension 3 and having rigidly fitted thereon within the top part of said tubular extension a top notch or hanger-collar 12, essentially consisting of a collar proper embracing the post and a series of radially-disposed bifurcated elements 13, each of which has pivotally mounted therein, as at 14, the upper end of a pendent hanger-arm 15 for one of the segmental supporting-bars constituting a swinging indicator-carrier 10. In each indicator-carrier the bar portion thereof is rigid with the lower end of the hanger-arm 15 and extends obliquely therefrom to adapt itself to the conformation of the semispherical case within which it is arranged, and each of said segmental bar portions constituting the supporting part of the carrier is designed to have supported thereon a plurality of individual measurers each designed for the measurement of a particular head-section or faculty.

Each individual measurer carried by the carriers 10 essentially comprises a measurement-indicator and a measuring-point. In the construction illustrated the measurement-indicator consists of a switch-base 16, of fiber or equivalent insulating material, and a shiftable contact-pointer 17, having a pivotal support at one end, as at 18, upon a fixed part of the carrier and having its free end portion arranged to operate within a guarding-keeper 19 and to play over a series of indicating-contacts 20. Each of these contacts has a wire connection $a$ with a corresponding indicating-contact 21 of a complemental individual record-indicator 22, constituting a part of the recording mechanism hereinafter described, said wire connection $a$ for the complemental contacts 20 and 21 therefore forming a part of the recording-circuit.

The measuring-point of each measurement-indicator is designated by the reference-numeral 23 and may conveniently consist of a pencil or finger slidably mounted, as at 24, upon the indicator-carrier 10 and having its point arranged to project through a clearance-opening 25, provided in the inner wall or shell of the case 2. The inner exposed end of each measuring-point 23 is designed to contact with the head-section or faculty to be measured thereby, and the opposite or outer end of each point or pencil has a pivotal or equivalent connection 26 with the shiftable contact-pointer 17 at an intermediate point between the ends of such pointer. In this connection it is to be observed that there is preferably associated with the pointer a setting-spring 27, connected thereto at one side of its pivot and also to an adjacent part of the carrier 10 to provide means for normally holding the pointer 17 retracted upon the lowermost indicating-contact 20. From the condition represented by the said lowermost contact the readings will necessarily vary, according as the pointer 17 is shifted into contact with the contacts above the latter contact, as plainly indicated in Fig. 2 of the drawings.

Any desired number of the indicating-contacts 20 and 21 may be employed, according to the number of readings or shadings to be provided for each head-section to be measured, but for illustrative purposes there is shown in the switch-base 16 of each measuring-indicator and the base of the complemental record-indicator 22 a series of five indicating-contacts, numbered, respectively, "I II III IV V." This number may be diminished or increased. (See Fig. 11.)

In order to secure accurate measurements, it is necessary that the indicator-carriers 10 and the measurement-indicators carried thereby should be adjusted synchronously and uniformly in proportion to the size of head being measured, so as to bring the indicating-points accurately over the same head-section or faculty in any size of head being measured. This is accomplished through the provision of a plurality of self-adjusting positioning members 28 and $28^a$, arranged radially in the same relation as the carriers 10 and their hanger-arms 15. The self-adjusting positioning members 28 and $28^a$ are designed to secure a positioning of the head within the head-piece in conformity with the lines upon which an accurate phrenographical examination is usually determined. The exact location of the head-sections or faculty zones is determined, usually, from a line termed the "basilar circumference," which is a line extending around the circumference of the base of the brain, passing just above the eyebrows and just above the ears, and also from the "transcoronal line," which extends from one ear to the other over the top of the head at the highest point. To secure accuracy, these lines are preserved by the positioning members 28 and $28^a$. The pair of positioning members 28 are disposed, respectively, at the front and back of the head, the front positioning member being provided at or contiguous to its lower end with a pair of inwardly-projecting locating-points 29 and 30 of different lengths and projecting through the clearance-openings 31, formed in the inner wall or shell of the case 2, while what may be properly termed the "back" positioning member 28 is provided at or contiguous to its lower end with an inwardly-projecting locating-point 32, projecting through a clearance-opening 33 in the inner wall or shell of the case. The locating-points 30 and 32, respectively, of the front and back positioning members 28 and $28^a$ are intended to be disposed within the plane of the basilar circumference, and to be guided as to this in each instance the front locating-point 30 is adapted to be engaged directly in the nasion, as plainly shown in Fig. 2 of the drawings, the other locating-point, 32, resting directly against the skull. The side positioning members $28^a$, occupying the plane of the transcoronal line of measurement, have fitted to their lower ends locating elements 34, preferably of a segmental form and constituting centering cuffs fitting over the top and back of the ear, thereby assisting materially in accurately positioning the measuring device upon the head. All of the positioning members 28 and $28^a$ adapt themselves to the size of head being measured. They are normally pressed inward sufficiently to engage the smallest-sized head provided for in the machine, and when larger-sized heads are introduced the positioning elements move outwardly and communicate a proportional adjustment to the carriers 10 for the individual measurers. To accomplish this, there is an adjusting connection between the several positioning members and the several indicator-carriers 10, and while this adjusting connection may be any mechanical device or appliance for communicating a proportional adjustment for the positioning members to the indicator-carriers a simple and practical construction is shown in the drawings for illustrative purposes.

Referring specifically to the illustrated construction, it will be observed that each positioning member 28 or 28ª is usually in the form of a curved or segmental strip conforming to the contour of the case 2 and having rigid with one end thereof an upstanding adjusting-lever 35, pivotally mounted intermediate its ends, as at 36, within a radially-disposed bearing-fork 37 of a notch or hanger-collar 38, essentially comprising a collar member suitably secured upon the central supporting-post 11 and the forks 37, radially projecting from the collar proper and corresponding in number to the number of positioning members employed in the head-piece or helmet. Preferably the bearing-forks 37 are of a sufficient projection to accommodate within the outer end portions thereof the hanger-arms 15 for the indicator-carriers, thus steadying and guiding these parts in their adjustment. Each of the adjusting-levers 35 of a positioning member is shown as having pivotally or otherwise operatively connected with its upper end, as at 38, the outer end of a sliding lifting-pin 39, having a wedge-face 40 lapping and coöperating with a corresponding face of the lifting-pin carried by the diametrically opposite adjusting-lever 35. The lapping and coöperating wedge-faces 40 of the separate pairs of lifting-pins are arranged one above the other and coöperate within the play-slots 41, provided in the central supporting-post 11. These lapping ends of the lifting-pins are also disposed beneath a cross-pin 42, fitted to the upper ends of the operating-links 43, whose lower ends are connected, as at 44, with a sliding runner-notch 45. The sliding runner-notch 45 is slidable upon the central supporting-post 11 and consists of a main collar member and a series of radially-disposed forks 46, in which are pivoted one end of the inner ends of spreader-links 47. The outer ends of these spreader-links are pivoted, as at 47ª, to hanger-arms 15 intermediate the upper and lower ends of such arms. A spring or equivalent retracting device 48 is connected to the runner 45 and a fixed point of attachment to provide for normally holding the spreading device collapsed, and said sliding runner-notch 45 has a fixed pin or equivalent fast connection 49 with a carrying-stem 50 for the central top measurement-indicator, which cannot be mounted on the main carriers 10 and which is designed for measuring the head-section or faculty immediately at the top and center of the head. This central top measurement-indicator is designated in its entirety by the numeral 51; but it embodies the same elements as all of the other measurement-indicators, and hence such elements are similarly numbered.

From the construction described it will be obvious that when larger-sized heads are introduced into the head-piece than the same is normally set for the positioning members 28 and 28ª move outwardly, and thereby oscillate the upper ends of their adjusting-levers 35 inwardly with the consequence of sliding the wedge-faces 40 in a direction for lifting the cross-pin 42. This lifting action upon the pin 42 causes a corresponding lift of the sliding runner 45, which in turn spreads the hanger-arms 15 "umbrella fashion," thereby causing a proportional adjustment of all of the indicator-carriers 10 to correspond with the adjustment of the positioning members. The same action causes the proportional adjustment of the central top measurement-indicator 51 on account of the direct connection of the support or carrier for the latter with the sliding runner 45.

As heretofore indicated, each measurement-indicator and the complemental record-indicator coöperating therewith represent one of the head-sections or faculties to be measured, such as the faculties representing veneration, individuality, friendship, destructiveness, combativeness, &c. Each of these faculties in turn has shadings or variations, according to the different readings assigned to each head-section or faculty. For instance, in the construction illustrated five different readings are provided for each faculty or head-section, these readings varying according to phrenological principles, as a particular head-section may be either normal or one or two points above or below normal.

The several individual-record indicators 22 are separate and distinct, and each preferably consists of a series of the indicating-contacts 21, arranged upon a fiber or equivalent base. These individual-record indicators may be conveniently grouped in a successive series to constitute what might be properly termed a "dial," placed in position upon a dial-base 52, arranged within a suitable cabinet 53, designed for the accommodation of the entire recording mechanism and upon which cabinet may be conveniently mounted the standard 8 for supporting the suspender for the head-piece or helmet 1. The dial-piece 52 may consist of fiber or other insulating material, and as a part of the recording mechanism there is associated with the dial, made up of the individual-record indicators, a traveling record-selector 54. This traveling record-selector 54 is in the form of a contact-pointer one end of which is adapted to pass over and contact with each and all of the record-indicating contacts 21. The other end of said selector 54 is made fast to a rotating arbor 55, mounted in suitable bearings within the cabinet 53 and carrying thereon a measurement-recorder 56, preferably in the form of a rotating printing-drum. The active surface of this rotating printing-drum 56 is divided off into sections corresponding to the head-sections or faculties represented by the measurement and record indicators, and each of these sections embraces a stereotype or equivalent printing plate 56ª, having a number of readings for the particular faculty represented by that section, said different readings corresponding to the number of indicating-contacts 20 and 21, respectively, on the measurement and record indicators.

The recording mechanism includes a motor for rotating the drum 56 and the record-selector 54, both of which are fast upon the arbor 55 and move in unison therewith. This motor may be of any approved construction and controlled in any practical manner; but for the purposes of illustration there is shown in the drawings a spring-motor which is intended to be wound up sufficiently at each operation of the machine to provide for causing the record-selector 54 to make one complete circuit of the series of individual record-indicators 22, and thus provide for selecting the particular readings indicated by the measuring device. This spring-motor may be conveniently mounted upon any suitable support within the cabinet, and essentially comprises an actuating-spring 57, a pair of separate ratchet-wheels 58 and 59, respectively, and a winding-gear 60. The winding-gear 60 and the controlling ratchet-wheel 59 are joined together to move in unison, but are loose on the arbor 55, while the other winding ratchet-wheel 58 is likewise loose on the arbor 55, but is independent in its movement in one direction of the ratchet-wheel 59. The actuating-spring 57 is connected at one end to the arbor 55 and at its other end made fast, as at 61, to the winding-ratchet 58. A check-pawl 62 is pivotally supported, as at 63, at a fixed point and is arranged to engage the teeth of the winding-ratchet 58, which teeth are disposed in a reversed direction to the teeth of the controlling-ratchet 59. The said teeth of the controlling-ratchet are engaged by the point of the spring-pressed locking-pawl 64, which is pivotally mounted upon one side of the winding-ratchet 58.

From the foregoing construction of spring-motor for the printing-drum and the record-selector it will be obvious that upon rotating the winding-gear 60 in a direction for tightening up the actuating-spring 57 said gear carries with it in the same direction the controlling ratchet-wheel 59. This direction of rotation keeps the teeth of the ratchet-wheel 59 locked with its pawl 64, which therefore causes the two ratchet-wheels 58 and 59 to move in unison, the pawl 62 permitting such movement of the ratchet 58. There is sufficient overplay for the traveling record-selector 54 to make one winding of the spring sufficient to cause said selector to pass over the entire series of record-indicators 22; but if it is not desired for the selector 54 to commence to move until the spring has been wound up entirely a suitable restraining detent 65$^a$ may be arranged at the starting-point for the pointer and withdrawn from its path after the head has been properly positioned in the head-piece and it is desired for the selector-pointer to commence its travel and select out the records to be printed on the phrenograph.

Figure 9:
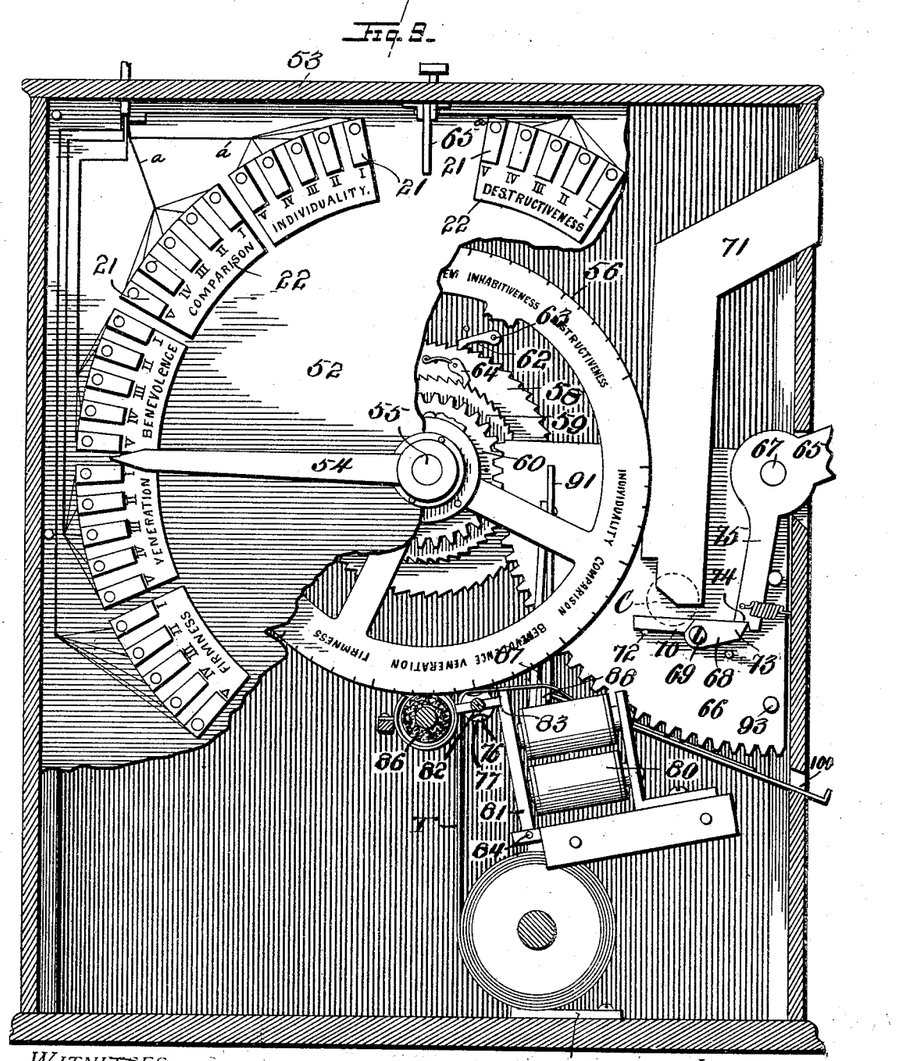
Fig. 9 is a sectional view on the line 9 9 of Fig. 8, the view being broken away in parts to expose the motor device for the printing-drum, the coin-controlled device, the impression device, and the cut-off mechanism for severing the phrenograph or record from the tape.

The winding up of the spring-motor for operating the selector 54 and the measurement recording or printing drum 56 is preferably accomplished through the medium of a coin-controlled setting device including a main operating-handle 65 and a key member 66, which in the construction shown is in the form of a toothed winding-segment. The toothed winding-segment 66 is loosely mounted on the pivot or axle 67 for the operating-handle 65, and the teeth of this segment mesh with the teeth of the winding-gear 60. A temporary coin-controlled coupling connection is effected between the key member or winding-segment 66 and the main operating-handle 65 through the employment of a coin-held tripping-detent 68, pivotally mounted intermediate its ends, as at 69, upon one side of the segment 66, and having at one side of the pivot a rest-arm 70, adapted to receive thereon the coin C, introduced into the machine through a suitably-arranged coin-chute 71. When the coin is introduced into said chute 71, the same falls upon the arm 70, which is limited in its movement by a stop-pin 72, but under the weight of the coin falls to a position for throwing the engaging point 73 of the detent into engagement with the shouldered extremity 74 of the setting-arm 75, projecting from the handle member 65 at one side of the pivotal support 67. With the parts thus arranged, as shown in Fig. 9 of the drawings, a depression of the handle serves to oscillate or turn the winding key or segment, which in turn communicates rotation to the winding-gear 60 in a direction for tightening up the actuating-spring 57 of the spring-motor. Thereupon the record-selector 54 and the printing-drum 56 are caused to move in unison after the restraining-detent 65$^a$ is disengaged from the selector 54 where it is desirable to employ such detent.

To provide for printing the record selected by the selector 54, there is associated with the printing-drum 56 means for inking the type-surface or printing-plates thereof and for making the necessary printing impression upon a blank tape T, a supply of which is arranged in roll form upon a suitable support within the cabinet 53 containing the recording mechanism. The blank tape T is arranged to pass over a normally inactive impression-roller 76, journaled in suitable bearings within the cabinet and arranged contiguous to the type-surface of the printing-drum and extending transversely across the entire width thereof. The impression-roller 76 may be properly termed a "mutilated" roller, inasmuch as the same is formed in the opposite sides with cut-away segments 77, which when presented opposite to the surface of the drum permit the blank tape T to lie in a non-feeding position out of contact with the drum. To provide for rotating the impression-roller 76, there is preferably employed a light friction drive therefor, consisting of a friction-pinion 78, carried by the shaft or the impression-roller, and a friction drive wheel or disk 79, carried by the drum 56 or by the arbor upon which it is mounted. This friction drive provides for positively rotating the impression-roller 76 when the latter is perfectly free to turn; but when said roller is latched against turning the drive is sufficiently light so as to not interfere with the rotation of the drum and the selector 54 under the influence of the motor. Except when a selected record or reading is to be printed from the drum the impression-roller 76 is held against turning through the medium of an electrically-controlled latch device comprising a latch-controlling magnet 80, an armature-latch 81, and a detent member 82 in the form of a cross-pin carried by the shaft for the impression-roller and projecting at both sides thereof. The ends of the detent member 82 are adapted to engage in the arresting-shoulder 83 of the armature-latch 81, the latter being pivotally mounted at one end, as at 84, and arranged to be controlled by the exposed core ends of the magnet or magnets 80. The terminals of the latch-controlling magnet have connected therewith the circuit-wires $b\ c$, the wire $b$ having metallic connection with the traveling record-selector 54, and the wire $c$ having connection with one pole of a battery or other source of electrical energy 85. The other pole of this battery has a wire connection $d$ with the metallic part of the carriers 10 for the measurement-indicators, thus providing the complete recording-circuit, which may only be interrupted by the traveling record-selector 54, which selector makes and breaks the circuit according to the particular recording-circuits provided for by the positions of the various shiftable contact-pointers 17.

Any suitable means for inking the type-surface or printing of the drum may be employed—such, for instance, as an inking-roll 86, arranged in contact with the type-surface of the drum and disposed at one side of the impression-roller or in any other well-positioned location.

There is also employed in connection with the recording mechanism a cut-off device for severing the phrenograph or printed record form the blank tape. This may conveniently consist of a pair of shears comprising a stationary or ledger blade 87 and a movable blade 88, bearing the usual shearing relation thereto. The stationary blade 87 is mounted in a fixed position transversely of the printing-drum beyond the impression-roller 76, and the blade 88 coöperating therewith is pivotally mounted at or contiguous to one end upon a pivot 89 and is designed to have connected with such pivoted end, as at 90, a reciprocatory operating-bar 91, normally drawn in one direction under the influence of a retracting-spring 92, connected therewith and with a fixed point of attachment. The operating-bar 91 is designed to be moved in a direction contrary to the influence of the spring through the medium of a setting-pin 93, carried by the winding key or segment 66 and adapted to be carried against a strike arm or projection 94, provided at the upper end of the operating-bar 91. This operating-bar is also provided at an intermediate point with a catch shoulder or notch 95, adapted to be engaged by the point 96 of a gravity holding-dog 97. The gravity holding-dog 97 is pivotally mounted upon the bracket 98, which may be conveniently employed for supporting the entire cut-off mechanism, although any equivalent supporting means may be utilized. The heel end of the gravity holding-dog 97 is adapted to be engaged by the release cam or projection 99, carried by the printing-drum 56 and providing means for releasing the dog 97 from the bar 91, thus permitting the spring 92 to come into play and operate the shears for cutting off the phrenograph or printed record of readings at the completion of the movement of the printing-drum or at the finish-point. When the phrenograph or printed record is severed from the tape, it may be removed entirely from the cabinet through the delivery-chute 100.

The arrangement of the detent member 82 is such that there will be a sufficient movement for the tape after the last impression on each phrenograph to carry it past the shearing-point before the feeding is arrested by the reëngagement of such detent member.

The cabinet containing the recording mechanism is so arranged with reference to the head-piece 1 that a person desiring to operate the machine will be so positioned as to be able to conveniently introduce the coin into the slot and also to manipulate the operating-handle 65. In thus using the machine the general operation is for the person to properly center the head within the head-piece or the helmet 1 through the medium of the locating elements 30, 32, and 34, and in thus positioning the head there would be a proportional adjustment of the indicator-carriers 10 according to the size of the head in the manner hereinbefore explained. The various measuring-points or pencils 23 by contacting with the different head-sections or faculties of intelligence will be pressed back more or less into the case, according to the size or development of such head-section or faculty, and in this adjustment of the measuring-points the same cause the shiftable contact-pointers 17, connected therewith, to move into contact with that one of the indicating-contacts 20 denoting the technical reading for the particular head-section or faculty measured.

Figures 3, 4, 5, 10, 11:
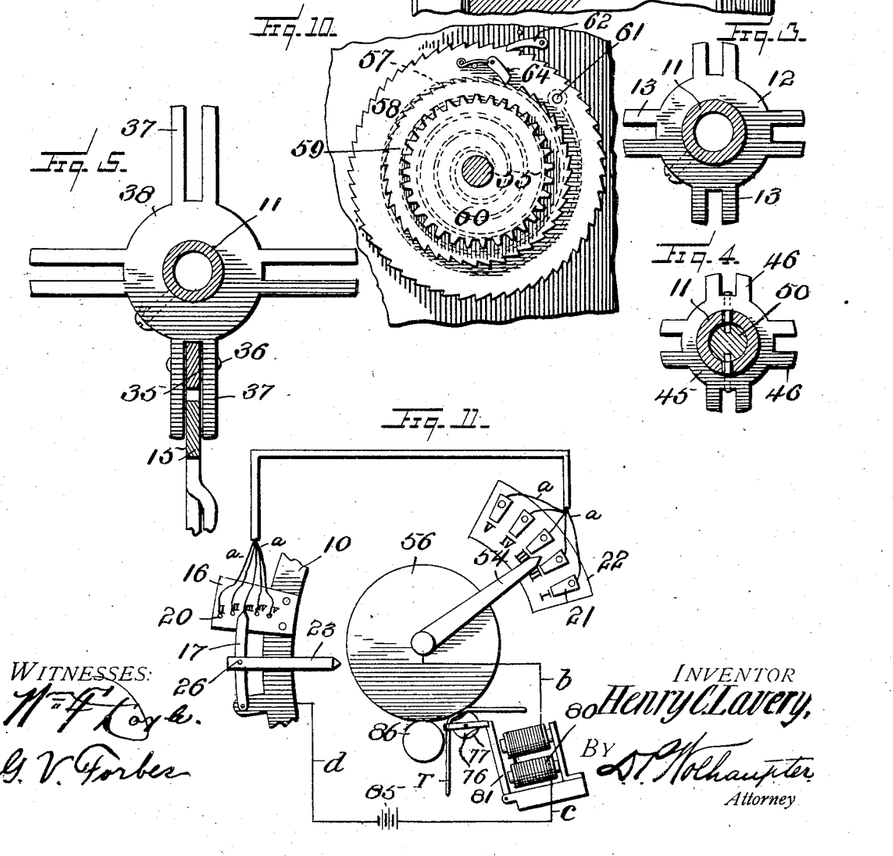
Figs. 3, 4, and 5 are detail cross-sectional views, respectively, on the lines 3 3, 4 4, and 5 5 of Fig. 2.
Fig. 10 is a detail view showing the relative positions of the various wheels comprising the spring-controlled motor device for the printing-drum.
Fig. 11 is a diagrammatic view showing the recording-circuit and the wire connections thereof between the measurement and record indicators.
Figure 8:
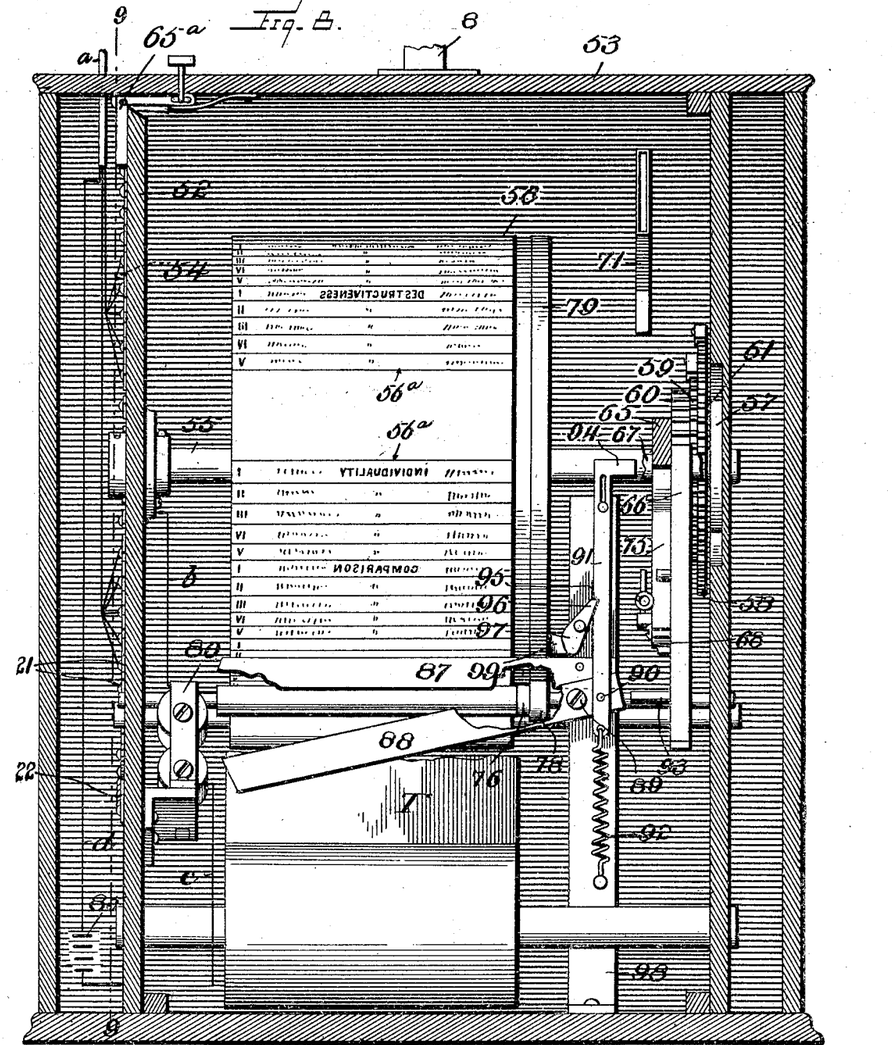
Fig. 8 is a vertical sectional view of the complete recording mechanism.

Inasmuch as the mechanical and electrical action of each measuring mechanism is alike, the diagrammatic illustration in Fig. 11 will exemplify the action of all of the rest. Referring to this diagram, it is assumed that the measurement-indicator shown therein has been set by the particular head-section or faculty to indicate the number "III" reading or delineation for that head-section or faculty. The wires *a* from the several indicating-contacts 20 connect directly with the corresponding or complemental contacts 21 of the complemental record-indicator 22 representing that particular head-section or faculty, and hence with the contact-pointer 17 in contact with the number "III" contact 20 of the measurement-indicator the circuit can only be completed through the number "III" contact 21 of the complemental record-indicator, and when the selector 54 is in contact with any of the other of said contacts 21 except the number "III" contact there will be no circuit. However, when the selector 54 comes into contact with the said number "III" contact of the record-indicator 22 (still referring to Fig. 11) a complete circuit will be established—viz., battery 85, wire *d*, metallic part 10, contact-pointer 17, number "III" contact 20, wire *a*, number "III" contact 21 of the record-indicator 22, record-selector 54, wire *b*, magnet 80, and wire *c* to battery. Upon the establishment of this circuit the armature-latch 81 is attracted, thereby releasing the detent member 82 and permitting the friction drive for the impression-roller 76 to carry the tape against the stereotype or printing plate representing the number "III" reading for the particular head-section or faculty represented by the measurement and record indicators through which the circuit has just been completed. The record-selector 54 travels from one record-indicator 22 to another and in each instance closes a recording-circuit for causing the printing of the selected record designated by the pointers of the measurement-indicators. After the record-selector has made a complete circuit of the entire series of record-indicators the release-cam 99 comes into play and causes a severing off of the phrenograph or printed record in the manner explained.

From the foregoing it is thought that the general and fundamental features of the invention will be understood; but it should be also understood that various changes in the form, proportion, and minor details of construction may be resorted to without departing from the spirit of the invention or sacrificing any of the advantages thereof.

Having thus described the invention, what is claimed, and desired to be secured by Letters Patent, is—

1. In a machine of the class described, a device having means for indicating the variations in development of an anatomical section, and a recording mechanism comprising means for automatically producing a record of each indication of said device and for delivering such record.

2. In a machine of the class described, a device having means for indicating the variations in development of an anatomical section, and a recording mechanism comprising means, controlled by said device, for automatically producing a record of the indications of said device and for delivering such record.

3. In a machine of the class described, a device having means for indicating the variations in development of an anatomical section, and means for selecting and making a record-reading of the indications of said device.

4. In a machine of the class described, a device having means for indicating the variations in development of an anatomical section, and means for selecting and delivering a record of each indication of said device.

5. In a machine of the class described, a device having means for indicating the variations in development of an anatomical section, and a recording mechanism having prepared records for each indication of said device, and means for selecting and printing the individual records.

6. In a machine of the class described, a plurality of devices each comprising means for indicating the variations in development of an anatomical section, and a recording mechanism comprising means for making a permanent record of the indication of each of said devices, and for delivering said record.

7. In a machine of the class described, a device having means for indicating the variations in development of an anatomical section, and a recording mechanism having prepared records for each indication of said device, and means for automatically selecting, printing, and delivering the individual records.

8. In a machine of the class described, a measuring device comprising means for indicating the measurement of an anatomical section, and a recording mechanism, controlled by said measuring device and comprising means for selecting a record corresponding to the indicated measurements of the measuring device, and means for delivering the record.

9. In a machine of the class described, a measuring device having a plurality of measurers for different anatomical sections, and a recording mechanism comprising means for selecting and printing a record for each measurer.

10. In a machine of the class described, a measuring device having a plurality of individual measurers for different anatomical sections, and a recording mechanism, controlled by said measuring device, and comprising means for automatically selecting and printing a separate record for each indicated measurement of each measurer.

11. In a machine of the class described, a device comprising means for indicating the physiological condition of an anatomical section, a recording mechanism having record-printing means, means for selecting a record for printing upon a blank, and means for delivering a printed blank.

12. In a machine of the class described, a measuring device having a plurality of individual measurers for different anatomical sections, and a recording mechanism having record-printing means, means for selecting a record corresponding to the indicated measurement of each measurer, and means for delivering a printed blank.

13. In a machine of the class described, a measuring device having a plurality of individual measurers for different anatomical sections, a recording mechanism comprising record-printing means, blank-tape-feeding means, means for selecting a record for printing corresponding to the indicated measurement of each measurer, and means for severing and delivering a printed record from the blank tape.

14. In a machine of the class described, a device comprising a plurality of indicators for different anatomical sections, and an automatic recording mechanism, operatively related to said device and comprising record-printing means, blank-tape-feeding means, means for selecting for printing a record corresponding to the indication of each of said indicators, and means for severing and delivering a printed record from the blank tape.

15. In a machine of the class described, a device comprising a plurality of indicators for indicating the physiological condition of different anatomical sections, and an automatic recording mechanism comprising a plurality of record-indicators complemental to said other indicators, record-printing means, blank-feeding means, means coöperating with all of the record-indicators for selecting for printing the record corresponding to the indications on the indicators, and means for delivering a printed record.

16. In a machine of the class described, a measuring device comprising a plurality of individual measurers each having measurement-indicating means set to variable positions by contact with an anatomical section, and a recording mechanism comprising means for automatically selecting and making a permanent record of the indications of each of said devices and for delivering such record.

17. In a machine of the class described, a measuring device comprising a plurality of individual measurers each having measurement-indicators including measurement-indicating means set by contact with an anatomical section, and a recorder having a selective printing mechanism embodying indicators complemental to those of the measuring device.

18. In a machine of the class described, a measuring device comprising a plurality of individual measurers proportionately adjustable to different sizes of an anatomical member, and a recorder having selective printing mechanism for recording the measurement of each measurer.

19. In a machine of the class described, a measuring device comprising a plurality of individual measurers proportionately adjustable to various sizes of an anatomical member and each having measuring-indicating means set by contact with a section of said anatomical member, and a selective recording mechanism coöperating with each of the individual measurers, and comprising means for selecting and printing each record.

20. In a machine of the class described, a measuring device comprising a plurality of individual measurers each consisting of a measurement-indicator and a measuring-point, and an automatic recorder having selective printing mechanism embodying indicators complemental to those of the individual measurers.

21. In a machine of the class described, a measuring device comprising a plurality of individual measurers proportionately adjustable to various sizes of an anatomical member and each consisting of a measurement-indicator and a measuring-point, the latter contacting with a section of the anatomical member, and an automatic recorder having selective printing mechanism embodying indicators complemental to those of the individual measurers.

22. In a machine of the class described, a measuring device comprising a plurality of self-adjusting indicator-carriers, and a series of individual measurers carried by said carriers and each consisting of a measurement-indicator and a measuring-point, and an automatic recorder operatively related to the individual measurers.

23. In a machine of the class described, a measuring device comprising a plurality of adjustable indicator-carriers, a series of individual measurers carried by said carriers and having indicating means, an adjustable positioning member comprising means for imparting a proportional adjustment to the indicator-carriers.

24. In a machine of the class described, a plurality of indicator-carriers, individual measurers carried by said carriers and having indicating means, and positioning means operatively connected with said carriers for imparting a proportional adjustment thereto.

25. In a machine of the class described, a measuring device having a plurality of adjustable indicator-carriers carrying individual measurers for different anatomical sections, and adjustable positioning members having locating elements and operatively related to the carriers for imparting thereto proportional adjustment.

26. In a machine of the class described, a measuring device comprising a plurality of adjustable indicator-carriers, individual measurers carried by said carriers, and a plurality of positioning members each having locating elements, all of said positioning members having a common operative connection with the indicator-carriers for imparting thereto a proportional adjustment according to the size of the anatomical member to be measured and delineated.

28. In a machine of the class described, a measuring device comprising a series of adjustable indicator-carriers, a plurality of individual measurers supported by said carriers and having measuring-points, and a plurality of positioning members having locating-points and operatively connected with said carriers for communicating a proportional adjustment thereto.

28. In a machine of the class described, a measuring device comprising a series of swinging indicating-carriers, each carrying a plurality of individual measurers having measuring-points, a plurality of swinging positioning members having locating elements for engagement with an anatomical member, said positioning members having a common adjustable connection with the several indicator-carriers for communicating thereto a proportional adjustment according to the size of the anatomical member to be measured.

29. In a machine of the class described, a measuring device comprising a series of swinging indicator-carriers each supporting a plurality of individual measurers having measuring-points for contact with a section of the anatomical member to be measured, a series of swinging positioning members having locating-points for engagement with said anatomical member, and adjusting connections between the positioning members and the carriers, said adjusting connections comprising means for spreading or contracting the indicator-carriers proportionately to the size of the anatomical member.

30. In a machine of the class described, a measuring device comprising a central support, a series of radially-arranged indicator-carriers pivotally hung from said support and each carrying a plurality of individual measurers having measuring-points, a series of radially-arranged self-adjusting positioning members also pivotally mounted upon said support and having locating elements for engagement with the part to be measured, a sliding runner, an adjusting element having a link connection with said runner, adjusting-levers extending from the positioning members, and sliding lifting-pins carried by said levers and having lapping wedge-faces operating beneath said adjusting element to provide for the movement of said sliding runner.

31. In a machine of the class described, a measuring device comprising a casing, a central supporting-post arranged within the casing, a series of swinging indicator-carriers pivotally hung from the post and each carrying a series of individual measurers having measuring-points, an extra individual measurer centrally arranged and having an independent carrier, a series of radially-arranged self-adjusting positioning members also pivotally hung from the post and having adjusting-levers and also locating elements for contact with the parts to be measured, a runner slidably mounted on said post and connected with the independent carrier for said extra measurer, spreader connections between the runner and the indicator-carriers, an adjusting element having operative link connections with the runner, and sliding lifting-pins connected with said adjusting-levers of the positioning members and provided with lapping wedge-faces operated beneath said adjusting element for communicating movement to the runner for spreading the indicator-carriers.

32. In a machine of the class described, a measuring device comprising a head-piece, indicator-carriers supported by the head-piece, and positioning members also supported by the head-piece and having locating elements for engagement with the head in the plane of the basilar circumference and the transcoronal line.

33. In a machine of the class described, a measuring device comprising a head-piece, a series of indicator-carriers supported by the head-piece, and a series of positioning members having an adjusting connection with the carriers, certain of said positioning members being arranged to lie over the front and back of the head and having inwardly-projecting locating-points, one for engagement with the nasion, and the other of said positioning members being arranged at opposite sides of the head and each carrying a centering-cuff for engagement with the ear.

34. In a machine of the class described, a measuring device comprising a head-piece having a case and a plurality of individual measurers for the different head-sections, and a recorder, controlled by said measurers, and comprising means for producing a record of each measurement.

35. In a machine of the class described, a measuring device comprising a head-piece carrying a plurality of individual measurers for the different head-sections, and a recorder having selective printing mechanism embodying indicators complemental to the individual measurers of the measuring device.

36. In a machine of the class described, a head-piece carrying a plurality of individual measurers each having measurement-indicating means set by contact with a head-section, and a recorder having selective printing mechanism embodying indicators complemental to the individual measurers.

37. In a machine of the class described, a measuring device comprising a head-piece carrying a plurality of individual measurers each having measurement-indicating means set by contact with a head-section, and an automatic recorder, controllable through the measuring device, and having selective printing mechanism embodying indicators complemental to the individual measurers.

38. In a machine of the class described, a measuring device comprising a head-piece carrying a plurality of individual measurers each consisting of a measurement-indicator and a measuring-point, and an automatic recording mechanism embodying indicators complemental to those of the individual measurers, and comprising means for selecting and printing a record of each measurement.

39. In a machine of the class described, a measuring device comprising a head-piece carrying a plurality of individual measurers each having a measurement-indicator, a recorder having selective printing mechanism embodying indicators complemental to those of the individual measurers, and electrical controlling means.

40. In a machine of the class described, a measuring device having a plurality of individual measurers each including a measurement-indicator, a recording mechanism having a plurality of record-indicators arranged in complemental relation to those of the individual measurers, a printing device including a traveling record-selector coöperating with the series of record-indicators, and a recording-circuit including said selector and separate wire connections between the individual elements of the complemental measurement and record-indicators.

41. In a machine of the class described, a measuring device having a series of individual measurers each including a measurement-indicator having a series of indicating-contacts and a pointer coöperating therewith, a recording mechanism comprising a series of separate record-indicators each complemental to one of the measurement-indicators and having a corresponding series of indicating-contacts, separate wire connections between the corresponding contacts of the complemental measurement and record indicators, printing devices having a plurality of records corresponding to all of the indications of the several indicators, a traveling record-selector coöperating with the record-indicators and the printing devices, and a recording-circuit including the selector, the complemental indicators, and the separate wire connections therewith.

42. In a machine of the class described, a measuring device comprising a plurality of individual measurers each having a measurement-indicator provided with a series of indicating-contacts, a recording mechanism including a successive series of individual record-indicators each complemental to one of the measurement-indicators and having a corresponding number of indicating-contacts, separate wire connections between the corresponding contacts of the complemental indicators, motor-actuated printing devices having a plurality of records corresponding to the indications of the several indicators, and a traveling record-selector arranged to move over and in contact with the contacts of the individual record-indicators, blank feeding and serving means, and recording-circuit connections including the complemental indicators and the traveling record-selector.

43. In a machine of the class described, a measuring device comprising a plurality of individual measurers each having measurement-indicating means set by contact with an anatomical section, and a recorder having selective printing mechanism embodying indicators complemental to those of the individual measurers, a traveling selector coöperating with said indicators, electrically-controlled recording printing means, blank feeding and severing means, and recording-circuit connections including the complemental indicators and the selector.

44. In a machine of the class described, a measuring device having a plurality of individual measurers, a recording mechanism comprising a plurality of individual record-indicators arranged in complemental relation to the individual measurers, circuit-wire connections between the complemental indicators, a motor-driven record-carrier, a traveling record-selector coöperating with the individual record-indicators, blank feeding and impression means, and an electrical controller for said blank feeding and impression means.

45. In a machine of the class described, a measuring device comprising a plurality of individual measurers, and a recording mechanism comprising a plurality of individual record-indicators arranged in complemental relation to the individual measurers, a motor-driven record-carrier, a traveling record-selector coöperating with the individual record-indicators, blank feeding and impression means, and an automatic controller and drive for the blank feeding and impression means.

46. In a machine of the class described, a measuring device comprising a plurality of individual measurers, and a recording mechanism comprising a plurality of individual measurers and a recording mechanism comprising a plurality of individual record-indicators arranged in complemental operative relation to the individual measurers, a motor-actuated printing-drum carrying the records, a similarly-actuated record-selector coöperating with the individual record-indicators, blank feeding and impression means coöperating with the printing-drum, and an automatic controller and drive for the blank feeding and impression means.

47. In a machine of the class described, a measuring device comprising a plurality of individual measurers and a recording mechanism comprising a plurality of individual record-indicators arranged in complemental op erative relation to the individual measurers, a motor-driven printing-drum, a similarly-operated selector carried with the drum and coöperating with the record-indicators, blank-tape feeding and impression means, a cut-off device for the printed blank, an automatic controller for the blank feeding and impression means, and an automatic controller for the cut-off.

48. In a machine of the class described, a measuring device comprising a plurality of individual measurers and a recording mechanism comprising a plurality of individual record-indicators arranged in complemental operative relation to the individual measurers, a motor-actuated printing-drum, a similarly-actuated selector coöperating with the record-indicators, a normally inactive combined tape feeding and impression roller coöperating with the printing-drum and a blank tape, an automatic controller for releasing and stopping said combined feeding and impression roller, a cut-off for the printing-blank, and means, controlled by the drum, for actuating said cut-off.

49. In a machine of the class described, a measuring device comprising a plurality of individual measurers, and a recording mechanism comprising a plurality of individual record-indicators arranged in complemental operative relation to the measurers and wired thereto, a motor-driven printing-drum, a similarly-operated record-selector coöperating with the record-indicators, inking means for the drum, a normally inactive mutilated combined feeding and impression roller having a friction-drive from the drum-actuating motor, and carrying the detent member, a blank tape arranged to extend over said roller, a latch-controlling magnet having an armature-latch coöperating with said detent member, and a recording-circuit including said magnet, the record-selector, and the complemental record-indicators and measurers.

50. In a machine of the class described, a measuring device comprising a plurality of individual measurers, a recording mechanism comprising a plurality of individual record-indicators arranged in complemental operative relation to the individual measurers, printing means including a record-selector and a motor-actuated printing-drum carrying a release device, intermittently-operating blank feeding and impression means, cut-off shears for the printing-blank including a movable member, an operating device for the movable shear member, a setting device for the machine having means for setting the shear-operating device, and means, controlled by said release device for causing the shears to operate in the severing operation.

51. In a machine of the class described, a measuring device comprising a plurality of individual measurers, and recording mechanism comprising a plurality of individual record-indicators, record selecting and printing means including a motor-actuated printing-drum carrying a release-cam, a cut-off device comprising stationary and movable shear-blades, a spring-retracted operating-bar connected with the movable shear-blade and provided with a strike projection and a catch-shoulder-holding dog adapted to normally engage said catch-shoulder and to be released through engagement of the release-cam at the finish operation, and a setting device for the recording mechanism including a key member carrying a tappet or setting-pin adapted to move against the strike projection of said operating-bar.

52. In a machine of the class described, a measuring device comprising a plurality of individual measurers, a recording mechanism comprising a plurality of individual record-indicators arranged in complemental operative relation to the individual measurers, record selecting and printing means including a rotatable record-carrier, a motor for the record-carrier having a winding-gear, a toothed key member engaging said gear, an operating-handle, and a releasable coupling connection between said operating-handle and the key member.

53. In a machine of the class described, the combination of a device comprising means for indicating the physiological condition of an anatomical section, a recording mechanism, controlled by said device, comprising means for making and delivering a record of the indications of said device, a setting member for starting the apparatus, an operating-handle, and a releasable coupling connection between said handle and the setting member.

In testimony whereof I affix my signature in presence of two witnesses.

HENRY C. LAVERY.

Witnesses:
H. JEFFERSON OBRIEN,
M. P. SCHMITT.